United States Patent Office 3,487,724
Patented Jan. 6, 1970

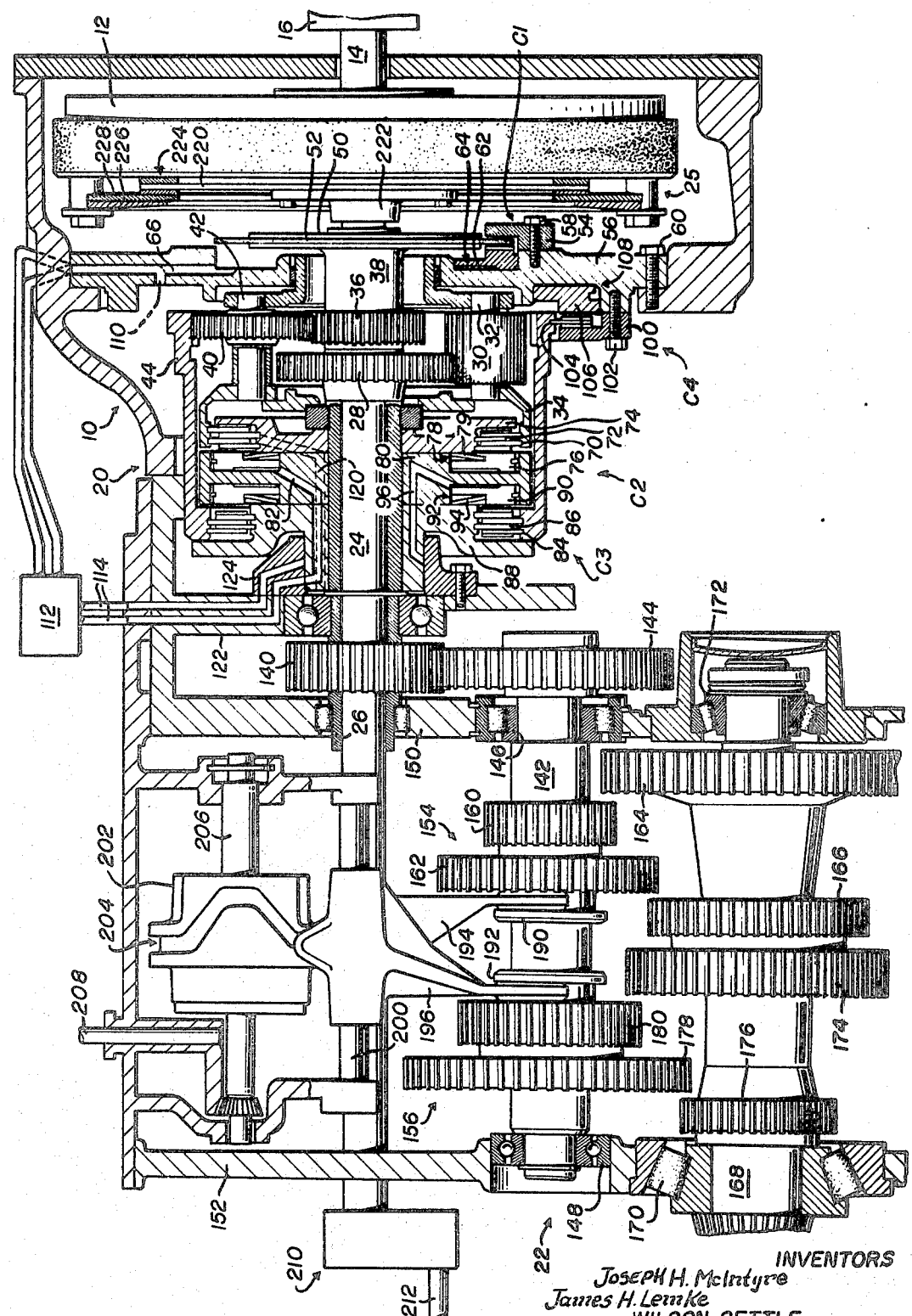

3,487,724
TRANSMISSION
Joseph H. McIntyre, Racine, and James H. Lemke, Sturtevant, Wis., assignors to J. I. Case Company, Racine, Wis., a corporation of Wisconsin
Filed May 5, 1967, Ser. No. 636,300
Int. Cl. F16h *37/06, 57/10*
U.S. Cl. 74—740        2 Claims

ABSTRACT OF THE DISCLOSURE

A multiple speed transmission for an industrial tractor in which a sliding gear transmission unit is combined with a planetary gear unit, the combination of which is capable of producing 12 forward speed ratios and four reverse speed ratios between the input and output members of the transmission.

BACKGROUND OF THE INVENTION

The present invention relates generally to transmissions and more particularly to an improved multi-speed planetary transmission unit which is capable of producing a plurality of forward speeds and a reverse speed.

Transmissions normally employed in heavy duty vehicles, such as agricultural and light industrial tractors, often require that the transmission be capable of being operated at a plurality of fixed ground speeds. Present day transmissions are being designed to provide increased numbers of ground speed so that the vehicle is more versatile and capable of being used in all types of agricultural and other operations.

One type of transmission which has proven successful in producing the desired results, mentioned above, is a combined multiple speed planetary drive unit and a multiple speed sliding gear unit. In this type of combined transmission, it has been customary to provide a plurality of planetary gear sets each including sun, planet and ring gears in the planetary transmission unit in order to produce the desired number of ratios between the input member and the output member or to limit the number of gears in the planetary gear set resulting in only two or three gear ratios produced between the input and output members of the planetary unit.

The cost of producing a transmission is directly related to the number of gears required since each additional gear requires an extensive amount of tooling and dies, which are usually very costly and complicated.

SUMMARY OF THE INVENTION

Generally speaking, the present invention comprises a transmission having a planetary gear unit which includes a plurality of gears uniquely arranged to produce a plurality of gear ratios between the input and output members of the gear unit. The invention also includes means for non-disengageably, frictionally connecting the input member to a power source which is capable of limiting the torque in the planetary unit. The transmission also includes means for directly driving a power take-off unit directly from the frictional connection to the power source.

The primary object of the present invention is to provide an improved planetary transmission unit which is capable of producing three forward and one reverse speed ratio.

Another object is to provide a planetary transmission unit having a reduced number of gears for producing three forward and one reverse speed.

A further object is to provide an improved transmission unit which automatically allows an indefinite amount of slippage between the driving member and the power transmission when the torque in the power transmission reaches a predetermined value.

Other objects and features of the invention will become apparent when considered in conjunction with the following specification and the accompanying drawings wherein:

The single figure of the drawings is a partial sectional elevation view of a transmission incorporating the present invention.

The transmission shown in the single figure includes a housing 10 and an input member 12 rotated by a shaft 14 driven by a suitable vehicle power source, such as an engine 16. The transmission housing 10 encloses a planetary drive unit 20 and a slidable gear drive unit 22.

According to the invention, the multiple speed planetary drive unit 20 is capable of producing at least three forward speeds and one reverse speed between the input and output members thereof. For this purpose, the planetary drive unit 20 includes an input shaft 24 connected through a torque limiting device 25 to the input member 12 and an output member or shaft 26. A first sun gear 28 is keyed to the input shaft and is in constant mesh with a first set of planet gears 30 rotatably journalled on pins 32 carried by a planetary carrier 34.

A second sun gear 36 is rotatably journalled on the input shaft 24 by a hollow shaft 38 and is in constant mesh with a plurality of planet gears 40 rotated on pins 42, also carried by the planetary carrier 34. The second planet gears 40 are also in constant mesh with teeth formed on the inner surfaces of a ring member 44. Although only one of each of the planet gears 30 and 40 is shown, it is readily apparent that a plurality of each of the planet gears are circumferentially disposed on carrier 34.

Friction engaging means are provided for selectively connecting the ring member and the planetary carrier to the output shaft and selectively holding the hollow shaft 38 and ring carrier or gear 44 as reaction members to produce the plurality of speeds mentioned above.

For this purpose, the hollow shaft 38 is provided with an integral flange 50 carrying the first disc or plate 52 of a friction engaging member or brake C1. A second disc is formed on an integral surface of a plate member 54 fixedly secured to a flange 56 by bolts 58 and the flange 56 is secured to the housing 10 through bolts 60. A movable pressure plate 62 is slidably received in an opening 64 formed in the flange 56 and is adapted to be moved into engagement with the disc 52 through fluid pressure being admitted through a port 66 formed in the flange 56. Thus, admission of pressurized fluid through port 66 will engage friction engaging member C1 to connect the hollow shaft 38 and sun gear 36 to the housing 10.

The carrier 34 is adapted to be connected to the output shaft 26 through a second friction engaging member or clutch C2 which includes friction plates 70 and 72, respectively connected to the carrier 34 and a flange 74 keyed to the output or intermediate shaft 26. A second pressure plate 76 is slidably received in an opening 78 formed in a member 80 carried on the intermediate shaft 26 and is spring biased to a disengaged position by washer 79. Fluid is selectively admitted through port 82 to frictionally engage plates 70, 72 and couple the carrier 34 to the intermediate or output shaft 26.

The ring gear 44 is adapted to be coupled to the output shaft 26 by a friction engaging member or clutch C3 which includes friction plates 84 and 86 respectively carried by the ring gear 44 and a member 88 keyed to the intermediate shaft 26. A pressure plate 90 for clutch C3 is slidably received in an opening 92 formed in the flange 80 and is spring biased in one direction by a washer 94. The friction plates 84, 86 are moved into frictional engagement by selectively admitting fluid through port 96 formed in the members 80 and 88.

The carrier 44 is also adapted to be fixed to the housing 10 of the transmission. For this purpose a second recessed plate 100 having a friction bearing surface is secured to the flange 56 by bolts 102. A friction plate 104 of the friction engaging member or brake C4 is secured by the carrier 44. A pressure plate 106 of friction engaging member C4 is slidably received in an opening 108 formed in the flange 56 and fluid is admitted to the opening via port 110 to frictionally lock the carrier 44 to the housing 10.

OPERATION OF THE PLANETARY UNIT

The first forward speed is obtained by frictionally engaging members C1 and C2 to fix sun gear 36 to the housing 10 and planetary carrier 34 to the output shaft 26 thereby driving the output shaft through the sun gear 28 and the planet gears 30. The second or intermediate forward speed is achieved by frictionally engaging members C1 and C3 which will stop rotation of shaft 38 and the second sun gear 36 to rotate the output shaft 26 through ring gear 44 and the planet gears 40 rotating about the fixed second sun gear 36. The third or high-speed is accomplished by frictionally engaging members C2 and C3 to obtain a direct drive between the input and output shafts of the planetary gear set, while the reverse speed is accomplished by frictionally engaging the second friction engaging member C2 to interconnect the planetary carrier with the output shaft 26 and engagement of the fourth friction engaging member C4 to discontinue rotation of the ring gear 44.

HYDRAULIC CONTROL

The means for selectively admitting fluid to the various friction engaging members or devices is illustratively shown as a valve group assembly 112 connected to the various ports 66, 82, 96 and 110 through suitable conduits 114. Although various types of hydraulic control systems are available for selectively supplying fluid to the four friction engaging devices the control valve assembly is preferably of the type disclosed in the co-pending application of John E. Bislew, Ser. No. 612,013 filed Jan. 26, 1967 and assigned to the assignee of the present application. The co-pending application, which is incorporated herein by reference, discloses a valve assembly which is capable of selectively, simultaneously engaging two devices to produce the above-mentioned speed ratios and is adapted to modulate the flow to friction engaging members or clutch C2. The valve assembly of the co-pending application also includes means for providing cooling fluid to clutch C2 when the clutch is only partially engaged and this cooling fluid is directed to the friction plates of clutch C2 through a port 120 formed in the members 74, 80 and 88. The fluid for engaging clutches C2 and C3 as well as the cooling fluid for clutch C2, is directed through a partition wall 122 to and through a fixed aperture member 124 carried by the partition wall, into the respective ports 82, 92 and 120.

SLIDING GEAR UNIT

The output of the planetary drive unit is transmitted through the intermediate shaft 26 via gear 140 to a countershaft 142 having a fixed gear 144 in constant mesh with gear 140. The countershaft is journalled in bearings 146, 148, respectively supported in partition walls 150 and 152. The countershaft has a pair of sets of sliding gears 154 and 156 keyed thereto to rotate therewith. The sliding gear 154 includes a pair of gears 160 162 adapted to be selectively placed in mesh with a first pair of gears 164 and 166 fixedly secured to an output shaft 168 of the sliding gear unit 22. The output shaft 168 is rotatably journalled in housing partition walls 150, 152 through suitable bearings 170 and 172 and has a second pair of spaced gears 174, 176 fixedly secured thereto which are adapted to be selectively placed in driving mesh with gears 178 and 180 of the sliding gear set 156.

A pair of shifter collars 190, 192 define grooves associated with each of the gear sets which respectively receive the yokes of shifter forks 194, 196. The yokes or shifter forks are guided on spaced rods 200 and are moved on the rods by a rotatable barrel 202 having a continuous groove 204 thereon. The barrel 204 is carried by a shaft 206 which is rotated through an actuating shaft 208. Thus, by rotating actuating shaft 208 and barrel 204, groove engaging means (not shown) carried by the forks 194, 196 will shift the forks axially to engage and disengage the gears of the sliding gear unit 22. For a more detailed description of the shifting mechanism reference may be made to co-pending application Ser. No. 610,649, filed Jan. 23, 1967 and assigned to the assignee of the present application.

PTO DRIVE

According to another aspect of the invention, the power take-off generally associated with a vehicle of this type is driven directly by the input member of the transmission. For this purpose, the input shaft 24 extends entirely through the transmission housing 10 terminating beyond the rear wall 152 in a gear box 210 having a power take-off shaft 212. Therefore, by directly connecting the input shaft 24 to the driven member 12 through the torque limiting device 25, the power take-off assembly is capable of being operated at any time when the engine 16 is operated.

TORQUE LIMITER

As was indicated above, according to another aspect of the invention, the input shaft is frictionally coupled through the engine driven member 12 through a non-disengageable, overload, torque limiting device 25. The constantly engaged overload torque limiting connection 25 includes a friction plate 220 secured to a hub 222 carried by the input shaft 24. The friction plate 220 is in constant frictional engagement with a surface 224 of the driven member 12. A second plate 226 is removably secured to the driven member 12 and is spaced from the surface 224 with a portion of the friction plate 220 extending between the adjacent surfaces. A friction ring 228, such as a Bevel washer, is interposed between the friction plate 220 and the plate 226 to constantly urge the friction plate 220 into frictional engagement with the surface 224.

Thus, if when the torque on the input shaft reaches a predetermined value, which may be produced either through an overload on the power take-off assembly or an overload on the transmission output shaft, the frictional contact between the surface 224 and the plate 220 will be overcome to allow an indefinite amount of slippage between the adjacent surfaces until such time as the overload on either the output shaft or the power take-off assembly is removed.

It is readily apparent that the disclosed planetary gear set provides a plural speed ratio transmission having less gears than were heretofore required to achieve the same number of drive ratios. Furthermore, the unique torque limiting connection between the power source and the transmission provides an automatic overload release to eliminate any damage which may occur to the transmission or the power take-off assembly when excessive forces are produced in either the transmission gear output shaft or the power take-off shaft.

While a preferred embodiment of the invention has been shown and described, it will be understood that various changes and modifications may be made without departing from the spirit of the invention as defined by the following claims.

We claim:

1. In a power transmission having input and output members rotatable in a housing, a first sun gear fixed to said input member, a hollow member rotatably journalled on said input member, a second sun gear carried by said hollow member, a planetary carrier having rotatable first planet gears in mesh with said first sun gear and rotatable second planet gears in mesh with said second sun gear, a ring gear in mesh with said second planet gears, first and second friction engaging members for alternatively connecting said ring gear to the output member and the housing, a third friction engaging member for selectively connecting the carrier to the output member, and a fourth friction engaging member for selectively connecting said hollow member to said housing to provide a plurality of forward ratios and a reverse ratio by selective actuation of two of said friction engaging members, said output member including a hollow shaft journalled on said input member, a gear fixed to said hollow shaft, a countershaft having a gear in mesh with the gear on said hollow shaft, an output shaft having a plurality of gears secured thereto, and gears on said countershaft selectively engageable with the plurality of gears on the output shaft whereby said output shaft may be driven at a plurality of ratios relative to the speed of said input member.

2. In a vehicle transmission including an engine having a power driven member, a housing, an input shaft extending through the housing, a power take-off shaft, means coupling said power take-off shaft to said input shaft, an output shaft, a multiple speed gear assembly interconnecting said input and output shafts, said multiple speed gear assembly including an intermediate shaft, means selectively connecting said intermediate shaft to said output shaft to produce a plurality of selectively engageable drive ratios between said shafts, means selectively connecting said input shaft to said intermediate shaft, said last means including a first sun gear secured to said input shaft, a second sun gear rotatably journalled on said input shaft, planet gears in mesh with said sun gears, a ring gear in mesh with the planet gears in mesh with said second sun gear, means for selectively connecting (1) the planet and ring gears to said intermediate shaft and (2) the ring gear and second sun gear to said housing to produce a plurality of ratios between said input and intermediate shafts for each of said ratios between the intermediate and output shafts, a constantly engaged overload torque limiting connection between the driven member and input shaft whereby operation of the engine will rotate said input shaft, said connection including a first plate in frictional engagement with said driven member, a second plate carried by said driven member adjacent to and spaced from said first plate and a friction ring interposed between plates to maintain said first plate in engagement with said driven member and allow relative movement therebetween only when the torque on the input shaft reaches a predetermined value.

References Cited
UNITED STATES PATENTS

| | | | |
|---|---|---|---|
| 815,642 | 3/1906 | Sears | 74—337.5 X |
| 901,456 | 10/1908 | Loitron | 74—337.5 X |
| 2,582,487 | 1/1952 | Kelbel | 74—759 |
| 2,747,416 | 5/1956 | Swenson et al. | 74—740 X |
| 2,772,582 | 12/1956 | Gerst | 74—740 |
| 2,862,403 | 12/1958 | Miller | 74—759 X |
| 2,982,153 | 5/1961 | Albertson et al. | 74—740 |
| 3,100,974 | 8/1963 | Wilson et al. | |
| 3,104,746 | 9/1963 | Gadd et al. | |
| 3,323,328 | 6/1967 | Montgomery | 64—30 |

DONLEY J. STOCKING, Primary Examiner

THOMAS C. PERRY, Assistant Examiner

U.S. Cl. X.R.

64—30; 74—15.6, 761